US011170576B2

(12) United States Patent
Ravasz et al.

(10) Patent No.: US 11,170,576 B2
(45) Date of Patent: Nov. 9, 2021

(54) PROGRESSIVE DISPLAY OF VIRTUAL OBJECTS

(71) Applicant: Facebook Technologies, LLC, Menlo Park, CA (US)

(72) Inventors: Jonathan Ravasz, London (GB); Etienne Pinchon, London (GB); Adam Varga, London (GB); Jasper Stevens, London (GB); Robert Ellis, London (GB); Jonah Jones, London (GB)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 16/578,251

(22) Filed: Sep. 20, 2019

(65) Prior Publication Data

US 2021/0090333 A1 Mar. 25, 2021

(51) Int. Cl.
*G06T 19/00* (2011.01)
*G02B 27/01* (2006.01)
*G06T 7/70* (2017.01)
*G06F 3/01* (2006.01)

(52) U.S. Cl.
CPC ............ *G06T 19/006* (2013.01); *G02B 27/01* (2013.01); *G06F 3/012* (2013.01); *G06F 3/013* (2013.01); *G06T 7/70* (2017.01)

(58) Field of Classification Search
CPC ......... G06T 19/006; G06T 7/70; G02B 27/01; G06F 3/012; G06F 3/013
USPC ...................................................... 345/633
See application file for complete search history.

(56) References Cited

U.S. PATENT DOCUMENTS

| 6,842,175 | B1 | 1/2005 | Schmalstieg et al. |
|---|---|---|---|
| 7,701,439 | B2 | 4/2010 | Hillis et al. |
| 8,558,759 | B1 | 10/2013 | Prada Gomez et al. |
| 8,947,351 | B1 | 2/2015 | Noble |
| 9,117,274 | B2 | 8/2015 | Liao et al. |

(Continued)

FOREIGN PATENT DOCUMENTS

WO 2018235371 A1 12/2018

OTHER PUBLICATIONS

Hincapie-Ramos, J.D. et al. "GyroWand: IMU-based raycasting for augmented reality head-mounted displays." Proceedings of the 3rd ACM Symposium on Spatial User Interaction, Aug. 2015, pp. 89-98.

(Continued)

*Primary Examiner* — Hai Tao Sun
(74) *Attorney, Agent, or Firm* — Potomac Law Group, PLLC

(57) ABSTRACT

A progressive display system can compute a virtual distance between a user and virtual objects. The virtual distance can be based on: a distance between the user and an object, a viewing angle of the object, and/or a footprint of the object in a field of view. The progressive display system can determine where the virtual distance falls in a sequence of distance ranges that correspond to levels of detail. Using a mapping between content sets for the object and levels of detail that correspond to distance ranges, the progressive display system can select content sets to display in relation to the object. As the user moves, the virtual distance will move across thresholds bounding the distance ranges. This causes the progressive display system to select and display other content sets for the distance range in which the current virtual distance falls.

20 Claims, 12 Drawing Sheets

(56) References Cited

U.S. PATENT DOCUMENTS

| | | |
|---|---|---|
| 9,292,089 B1 | 3/2016 | Sadek |
| 9,477,368 B1 | 10/2016 | Filip et al. |
| 9,530,252 B2 | 12/2016 | Poulos et al. |
| 9,817,472 B2 | 11/2017 | Lee et al. |
| 10,220,303 B1 | 3/2019 | Schmidt et al. |
| 10,248,284 B2 | 4/2019 | Itani et al. |
| 10,473,935 B1 | 11/2019 | Gribetz et al. |
| 10,521,944 B2 | 12/2019 | Sareen et al. |
| 2008/0089587 A1 | 4/2008 | Kim et al. |
| 2010/0306716 A1 | 12/2010 | Perez |
| 2011/0267265 A1 | 11/2011 | Stinson |
| 2012/0069168 A1 | 3/2012 | Huang et al. |
| 2012/0143358 A1 | 6/2012 | Adams et al. |
| 2012/0188279 A1* | 7/2012 | Demaine ................. G06T 15/00 345/633 |
| 2012/0206345 A1 | 8/2012 | Langridge |
| 2012/0275686 A1 | 11/2012 | Wilson et al. |
| 2012/0293544 A1 | 11/2012 | Miyamoto et al. |
| 2013/0063345 A1 | 3/2013 | Maeda |
| 2013/0125066 A1 | 5/2013 | Klein et al. |
| 2013/0147793 A1 | 6/2013 | Jeon et al. |
| 2013/0265220 A1 | 10/2013 | Fleischmann et al. |
| 2014/0125598 A1 | 5/2014 | Cheng et al. |
| 2014/0236996 A1 | 8/2014 | Masuko et al. |
| 2014/0357366 A1* | 12/2014 | Koganezawa ...... A63F 13/5255 463/31 |
| 2014/0375691 A1* | 12/2014 | Kasahara ................. G06T 11/60 345/633 |
| 2015/0035746 A1 | 2/2015 | Cockburn et al. |
| 2015/0054742 A1 | 2/2015 | Imoto et al. |
| 2015/0062160 A1 | 3/2015 | Sakamoto et al. |
| 2015/0077592 A1 | 3/2015 | Fahey |
| 2015/0153833 A1 | 6/2015 | Pinault et al. |
| 2015/0160736 A1 | 6/2015 | Fujiwara |
| 2015/0169076 A1 | 6/2015 | Cohen et al. |
| 2015/0181679 A1 | 6/2015 | Liao et al. |
| 2015/0206321 A1 | 7/2015 | Scavezze et al. |
| 2015/0220150 A1 | 8/2015 | Plagemann et al. |
| 2015/0261659 A1 | 9/2015 | Bader et al. |
| 2015/0356774 A1 | 12/2015 | Gal et al. |
| 2016/0110052 A1 | 4/2016 | Kim et al. |
| 2016/0147308 A1 | 5/2016 | Gelman et al. |
| 2016/0170603 A1 | 6/2016 | Bastien et al. |
| 2016/0378291 A1 | 12/2016 | Pokrzywka |
| 2017/0060230 A1 | 3/2017 | Faaborg et al. |
| 2017/0076500 A1 | 3/2017 | Maggiore et al. |
| 2017/0109936 A1 | 4/2017 | Powderly et al. |
| 2017/0139478 A1 | 5/2017 | Jeon et al. |
| 2017/0192513 A1 | 7/2017 | Karmon et al. |
| 2017/0262063 A1 | 9/2017 | Blenessy et al. |
| 2017/0278304 A1 | 9/2017 | Hildreth et al. |
| 2017/0287225 A1 | 10/2017 | Powderly et al. |
| 2017/0296363 A1 | 10/2017 | Yetkin et al. |
| 2017/0323488 A1 | 11/2017 | Mott et al. |
| 2017/0364198 A1 | 12/2017 | Yoganandan et al. |
| 2018/0059901 A1 | 3/2018 | Gullicksen |
| 2018/0107278 A1 | 4/2018 | Goel et al. |
| 2018/0113599 A1 | 4/2018 | Yin |
| 2018/0300557 A1 | 10/2018 | Rodenas et al. |
| 2018/0307303 A1 | 10/2018 | Powderly et al. |
| 2018/0322701 A1 | 11/2018 | Pahud et al. |
| 2018/0335925 A1 | 11/2018 | Hsiao et al. |
| 2018/0357780 A1* | 12/2018 | Young ....................... G06T 7/20 |
| 2019/0094981 A1 | 3/2019 | Bradski et al. |
| 2019/0107894 A1 | 4/2019 | Hebbalaguppe et al. |
| 2019/0213792 A1 | 7/2019 | Jakubzak et al. |
| 2019/0258318 A1 | 8/2019 | Qin et al. |
| 2019/0278376 A1 | 9/2019 | Kutliroff et al. |
| 2019/0279424 A1 | 9/2019 | Clausen et al. |
| 2019/0279426 A1 | 9/2019 | Musunuri et al. |
| 2019/0286231 A1 | 9/2019 | Burns et al. |
| 2019/0362562 A1 | 11/2019 | Benson |
| 2019/0369391 A1* | 12/2019 | Cordesses ............. G06T 19/006 |
| 2019/0377416 A1 | 12/2019 | Alexander |
| 2020/0082629 A1* | 3/2020 | Jones .................... G06T 19/006 |
| 2020/0097077 A1 | 3/2020 | Nguyen et al. |
| 2020/0097091 A1 | 3/2020 | Chou et al. |
| 2020/0218423 A1 | 7/2020 | Ohashi |
| 2020/0225736 A1 | 7/2020 | Schwarz et al. |
| 2020/0225758 A1 | 7/2020 | Tang et al. |
| 2020/0226814 A1 | 7/2020 | Tang et al. |
| 2020/0363930 A1 | 11/2020 | Srinivasan et al. |
| 2021/0012113 A1 | 1/2021 | Petill et al. |

OTHER PUBLICATIONS

Schweigert, R. et al. "EyePointing: A gaze-based selection technique." Proceedings of Mensch and Computer, Sep. 8, 2019, pp. 719-723.

Mayer, S. et al. "The effect of offset correction and cursor on mid-air pointing in real and virtual environments." Proceedings of the 2018 CHI Conference on Human Factors in Computing Systems, Apr. 2018, pp. 1-13.

Olwal, A. et al. "The Flexible Pointer: An Interaction Technique for Selection in Augmented and Virtual Reality," Proceedings of ACM Symposium on User Interface Software and Technology (UIST), pp. 81-82, publication date Nov. 5, 2003.

Renner, P. et al. "Ray Casting", <www.techfak.uni-bielefeld.de/~tpfeiffe/lehre/VirtualReality/interaction/ray_casting.htm> [accessed Apr. 7, 2020], 2 pages.

"Unity Gets Toolkit for Common AR/VR Interactions" <youtu.be/ZPhv4qmT9EQ> [accessed Apr. 7, 2020]. Unity XR Interaction Toolkit Preview Dec. 19, 2019.

International Search Report and Written Opinion, PCT Patent Application PCT/US2020/051763, dated Feb. 3, 2021, 11 pages.

* cited by examiner

PROGRESSIVE DISPLAY OF VIRTUAL OBJECTS

CROSS-REFERENCE TO RELATED APPLICATIONS

This application is related to the U.S. patent application Ser. No. 16/578,221 filed concurrently herewith, titled "PROJECTION CASTING IN VIRTUAL ENVIRONMENTS;" the U.S. patent application Ser. No. 16/578,236 filed concurrently herewith, titled "GLOBAL AND LOCAL MODE VIRTUAL OBJECT INTERACTIONS;" the U.S. patent application Ser. No. 16/578,240 filed concurrently herewith, titled "THREE-STATE GESTURE VIRTUAL CONTROLS;" and the U.S. patent application Ser. No. 16/578,260 filed concurrently herewith, titled "VIRTUAL INTERACTIONS AT A DISTANCE;" all of which are herein incorporated by reference in their entireties.

TECHNICAL FIELD

The present disclosure is directed to controlling object display in an artificial reality environment.

BACKGROUND

In an artificial reality environment, a user sees and interacts with "virtual objects," i.e. computer-generated object representations. Virtual objects can be presented, e.g., by a head-mounted display, mobile device, projection system, etc. In some systems, an artificial reality system can also modify the display of real objects that exist independent of the computer system that controls the artificial reality environment. For example, a user can select a real object and add a virtual overlay to change the object's shape, color, or some other way the object is presented to the user. As used herein, unless otherwise specified, an "object" can be a real or virtual object. In some cases, an artificial reality system can track a user's position within the artificial reality environment, allowing the user to move and interact with objects, e.g., in three degrees of freedom (3DoF) or six degrees of freedom (6DoF).

BRIEF DESCRIPTION OF THE DRAWINGS

The techniques introduced here may be better understood by referring to the following Detailed Description in conjunction with the accompanying drawings, in which like reference numerals indicate identical or functionally similar elements.

DETAILED DESCRIPTION

Figure 1:
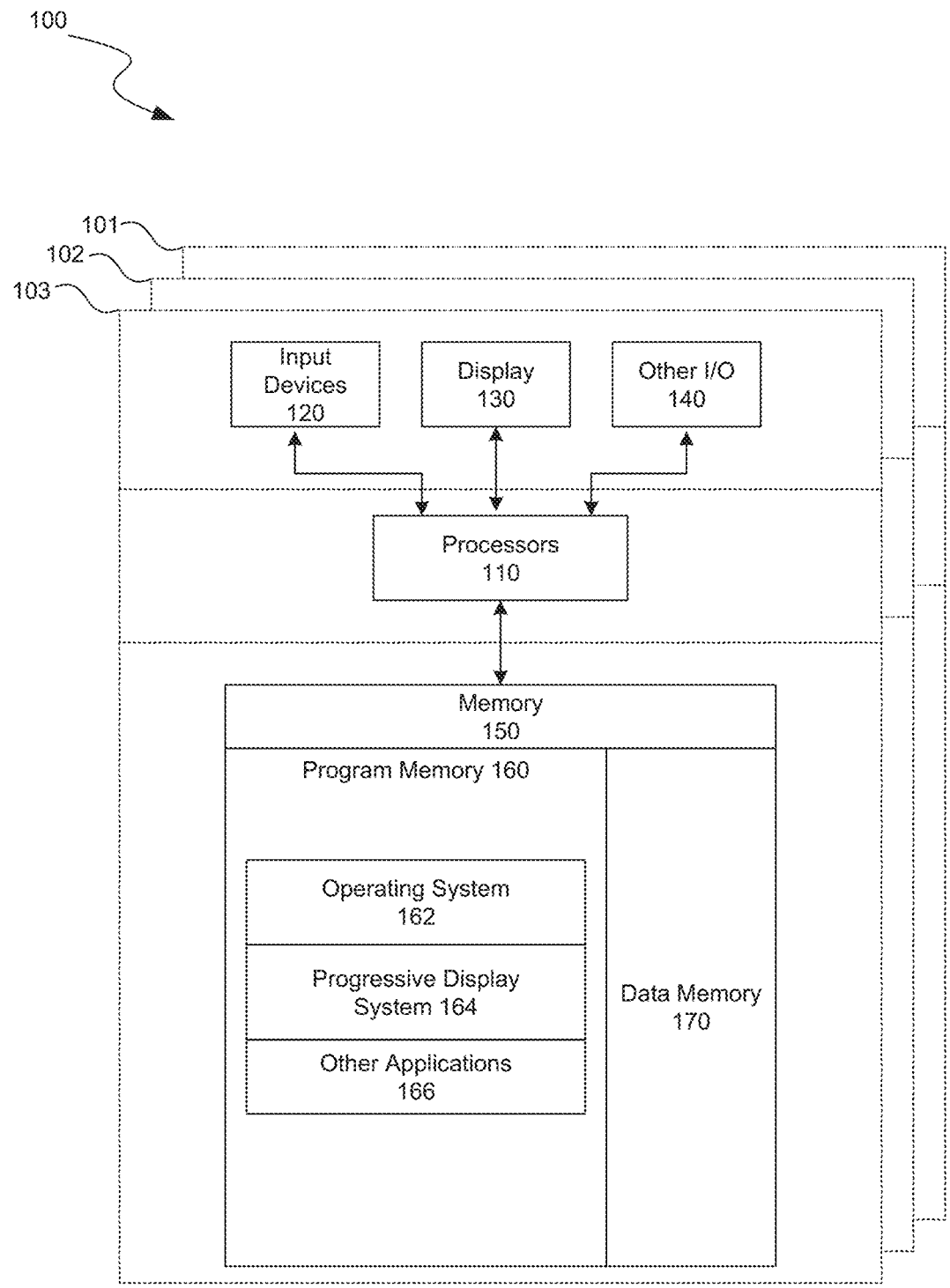
FIG. 1 is a block diagram illustrating an overview of devices on which some implementations of the present technology can operate.

Embodiments are described herein for varying displayed content, in an artificial reality environment, based on a virtual distance between a user and object(s). A progressive display system can compute a virtual distance between a user and object(s). The virtual distance can be based on: a distance between the user and the object, a viewing angle of the object, and/or a footprint of the object in a field of view. The progressive display system can determine where the virtual distance falls in a sequence of distance ranges corresponding to levels of detail. Using a mapping between content sets for the object and levels of detail that correspond to distance ranges, the progressive display system can select content sets to display in relation to the object. As the user or object moves, the virtual distance will move across thresholds bounding the distance ranges. This causes the progressive display system to select and display other content mapped to the level of detail corresponding to the distance range in which the current virtual distance falls.

Existing artificial reality systems use two principal behaviors to scale information in spatial computing: natural scaling and inverse scaling. With natural scaling, the content displayed with an object is sized inversely proportionate to the distance at which the object appears to the user. Thus, as the distance increases, the size of the content decreases. Objects displayed with natural scaling appear like real objects, becoming harder to distinguish as they appear farther from the user. With inverse scaling, content size remains consistent regardless of apparent distance to the containing object, making the content grow proportionally with respect to the container as distance increases. Although inverse scaling can be an effective way of representing information in space, it is "unaware" of its surroundings. Therefore, it can easily interfere with the rest of the environment (e.g., clipping, occluding, etc.). Inverse scaling also prevents the user from using world-locked information as a depth cue, as it maintains the same angular size within the user's field of view.

The progressive display system can overcome these issues by mapping content sets for objects to ranges of virtual distances between the user and object. In various implementations, a "virtual distance" can be a value, or combination of values, measuring one or more of: a distance between a user and a location within the artificial reality environment where the object appears to be to the user, a viewing angle of the object in relation to the user, and/or a footprint of the object in relation to a total field of view in which the object is presented. In some implementations, different applications within the same artificial reality system can set different functions for defining the virtual distance, e.g., by selecting which combination of inputs contribute to virtual distance and how each is weighted.

The progressive display system can select content and/or content styles based on mappings to levels of detail. For example, the progressive display system can determine a distance to an object, a rotation of the object in relation to the user, and an amount of viewable area the object takes up for the user (e.g., as a 3-tuple or combined value). The progressive display system can determine where the virtual distance falls in a sequence of distance ranges corresponding to levels of detail and can select and display the content, for the object, that is assigned to the level of detail. As the user or object moves, the virtual distance will move across thresholds bounding the distance ranges. This causes the progressive display system to select and display other content mapped to the level of detail corresponding to the distance range in which the current virtual distance falls. More specific examples are provided below in relation to FIGS. 6 and 7. Various kinds of content can be mapped to each display level, such as text, images, patterns, or even controls, menu items, or other functional elements. For example, different controls, buttons, menu options, etc., can be displayed with an object when the object appears far away. In such instances, precise movements on the object can be difficult, making controls that require such precise movement less relevant and therefore not displayed until the object appears closer. In some implementations, an object can be a collection of other objects, and the user's virtual distance to the object collection can determine which of the collection is displayed.

A virtual distance can, at times, be near a border between distance ranges. This can cause the content displayed for the object to jitter between content sets. To overcome this, the progressive display system can apply hysteresis such that the distance ranges overlap. Thus, there can be different lower thresholds for entering versus exiting a distance range. For example, a scale-up threshold marking the upper bound for transitioning from a first distance range to a second distance range can be larger than a scale-down threshold marking the lower bound for transitioning back to the first distance range from the second distance range. Thus, when a virtual distance measurement causes a transition to the second range, a small decrease in the virtual distance measurement may not immediately cause a transition back to the first distance range. Similarly, there can be different bounds between each distance range.

In some implementations, an object creator can define the mappings between content sets and detail levels. In other implementations, a set of rules can define how content associated with an object is distributed between the available detail levels. For example, rules can define minimums or maximums for text sizes, minimums or maximums for spacing between content items, types of content to display at various display levels, etc. In some implementations, a combination of these approaches can be used, such that the object creator defines content mappings for some content (e.g., specifying that particular content always be displayed or displayed at particular detail levels) and the object creator or system can apply rules for distributing other content while conforming to the defined mappings.

Embodiments of the disclosed technology may include or be implemented in conjunction with an artificial reality system. Artificial reality or extra reality (XR) is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, a "cave" environment or other projection system, or any other hardware platform capable of providing artificial reality content to one or more viewers.

"Virtual reality" or "VR," as used herein, refers to an immersive experience where a user's visual input is controlled by a computing system. "Augmented reality" or "AR" refers to systems where a user views images of the real world after they have passed through a computing system. For example, a tablet with a camera on the back can capture images of the real world and then display the images on the screen on the opposite side of the tablet from the camera. The tablet can process and adjust or "augment" the images as they pass through the system, such as by adding virtual objects. "Mixed reality" or "MR" refers to systems where light entering a user's eye is partially generated by a computing system and partially composes light reflected off objects in the real world. For example, a MR headset could be shaped as a pair of glasses with a pass-through display, which allows light from the real world to pass through a waveguide that simultaneously emits light from a projector in the MR headset, allowing the MR headset to present virtual objects intermixed with the real objects the user can see. "Artificial reality," "extra reality," or "XR," as used herein, refers to any of VR, AR, MR, or any combination or hybrid thereof.

Existing artificial reality systems fail to display content in a manner that both integrates into the artificial reality environment and is easily distinguishable at different distances. This makes existing artificial reality systems frustrating to operate and less able to accurately convey information to users. The progressive display system and processes described herein overcome these problems associated with existing artificial reality systems and are expected to decrease cognitive load on users, decrease misinterpretations, and provide variable, yet distance-appropriate, functionality. The artificial reality systems and processes described herein are rooted in computerized artificial reality systems, instead of being an analog of traditional virtual object viewing. For example, when displaying virtual objects, existing computing systems generally resize and change styles to fit the content to the viewing area, but do not change and constantly update the content and/or functionality associated with an object based on the user's current virtual distance to the object.

Several implementations are discussed below in more detail in reference to the figures. FIG. 1 is a block diagram illustrating an overview of devices on which some implementations of the disclosed technology can operate. The devices can comprise hardware components of a computing system 100 that selects content to display in association with an object based on a virtual distance to the object. In various implementations, computing system 100 can include a single computing device 103 or multiple computing devices (e.g., computing device 101, computing device 102, and computing device 103) that communicate over wired or wireless channels to distribute processing and share input data. In some implementations, computing system 100 can include a stand-alone headset capable of providing a computer created or augmented experience for a user without the need for external processing or sensors. In other implementations, computing system 100 can include multiple computing devices such as a headset and a core processing component (such as a console, mobile device, or server system) where some processing operations are performed on the headset and others are offloaded to the core processing component. Example headsets are described below in relation to FIGS. 2A and 2B. In some implementations, position and environment data can be gathered only by sensors incorporated in the headset device, while in other implementations one or more of the non-headset computing devices can include sensor components that can track environment or position data.

Computing system 100 can include one or more processor(s) 110 (e.g., central processing units (CPUs), graphical processing units (GPUs), holographic processing units (HPUs), etc.) Processors 110 can be a single processing unit or multiple processing units in a device or distributed across multiple devices (e.g., distributed across two or more of computing devices 101-103).

Computing system 100 can include one or more input devices 120 that provide input to the processors 110, notifying them of actions. The actions can be mediated by a hardware controller that interprets the signals received from the input device and communicates the information to the processors 110 using a communication protocol. Each input device 120 can include, for example, a mouse, a keyboard, a touchscreen, a touchpad, a wearable input device (e.g., a haptics glove, a bracelet, a ring, an earring, a necklace, a watch, etc.), a camera (or other light-based input device, e.g., an infrared sensor), a microphone, or other user input devices.

Processors 110 can be coupled to other hardware devices, for example, with the use of an internal or external bus, such as a PCI bus, SCSI bus, or wireless connection. The processors 110 can communicate with a hardware controller for devices, such as for a display 130. Display 130 can be used to display text and graphics. In some implementations, display 130 includes the input device as part of the display, such as when the input device is a touchscreen or is equipped with an eye direction monitoring system. In some implementations, the display is separate from the input device. Examples of display devices are: an LCD display screen, an LED display screen, a projected, holographic, or augmented reality display (such as a heads-up display device or a head-mounted device), and so on. Other I/O devices 140 can also be coupled to the processor, such as a network chip or card, video chip or card, audio chip or card, USB, firewire or other external device, camera, printer, speakers, CD-ROM drive, DVD drive, disk drive, etc.

Computing system 100 can include a communication device capable of communicating wirelessly or wire-based with other local computing devices or a network node. The communication device can communicate with another device or a server through a network using, for example, TCP/IP protocols. Computing system 100 can utilize the communication device to distribute operations across multiple network devices.

The processors 110 can have access to a memory 150, which can be contained on one of the computing devices of computing system 100 or can be distributed across of the multiple computing devices of computing system 100 or other external devices. A memory includes one or more hardware devices for volatile or non-volatile storage, and can include both read-only and writable memory. For example, a memory can include one or more of random access memory (RAM), various caches, CPU registers, read-only memory (ROM), and writable non-volatile memory, such as flash memory, hard drives, floppy disks, CDs, DVDs, magnetic storage devices, tape drives, and so forth. A memory is not a propagating signal divorced from underlying hardware; a memory is thus non-transitory. Memory 150 can include program memory 160 that stores programs and software, such as an operating system 162, progressive display system 164, and other application programs 166. Memory 150 can also include data memory 170 that can include e.g., content associated with detail levels for various objects, content-to-distance level rules, distance range specifications, virtual distance weights and configurations, settings, user options or preferences, etc., which can be provided to the program memory 160 or any element of the computing system 100.

Some implementations can be operational with numerous other computing system environments or configurations. Examples of computing systems, environments, and/or configurations that may be suitable for use with the technology include, but are not limited to, XR headsets, personal computers, server computers, handheld or laptop devices, cellular telephones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

Figure 2A:
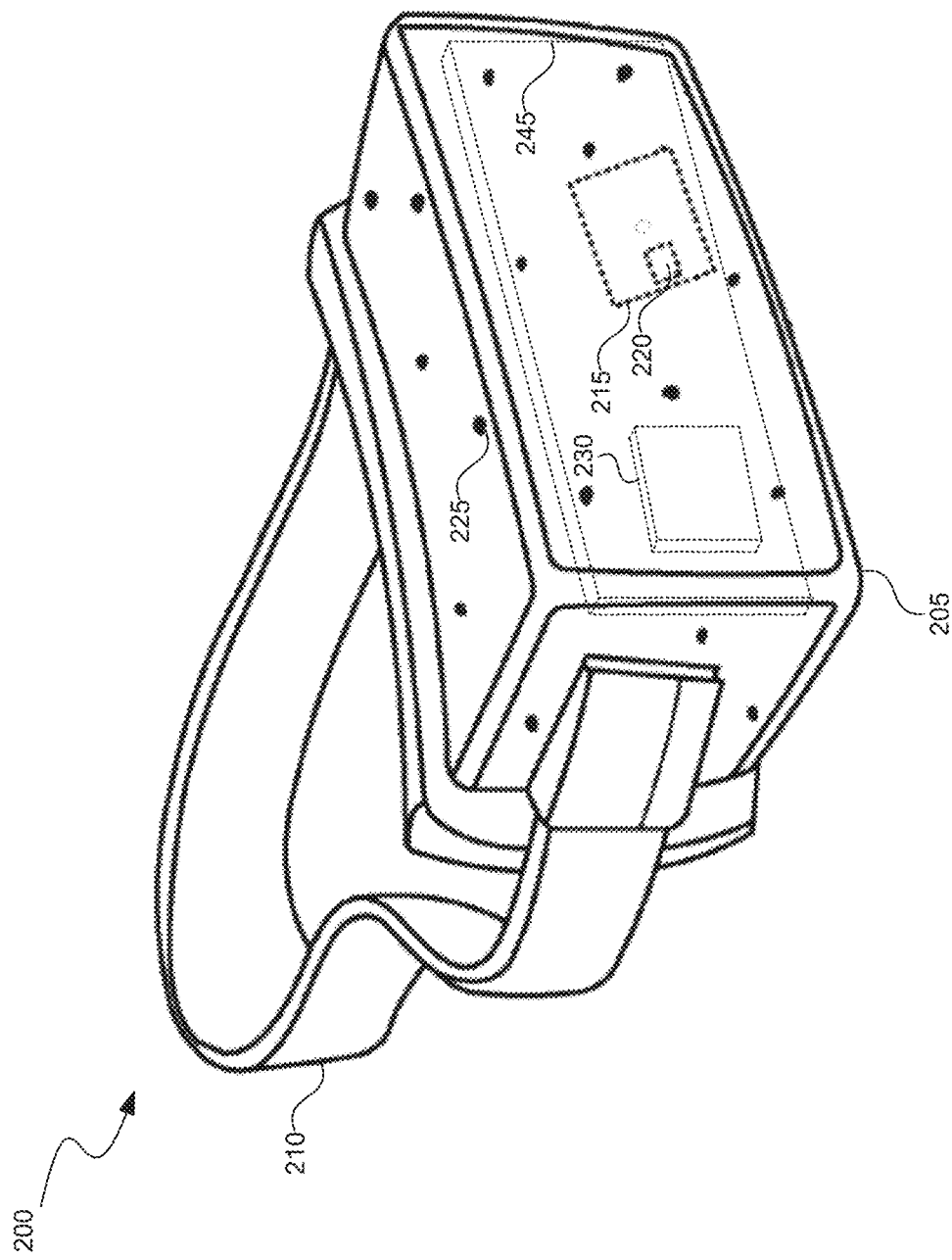
FIG. 2A is a wire diagram illustrating a virtual reality headset which can be used in some implementations of the present technology.

FIG. 2A is a wire diagram of a virtual reality head-mounted display (HMD) 200, in accordance with some embodiments. The HMD 200 includes a front rigid body 205 and a band 210. The front rigid body 205 includes one or more electronic display elements of an electronic display 245, an inertial motion unit (IMU) 215, one or more position sensors 220, locators 225, and one or more compute units 230. The position sensors 220, the IMU 215, and compute units 230 may be internal to the HMD 200 and may not be visible to the user. In various implementations, the IMU 215, position sensors 220, and locators 225 can track movement and location of the HMD 200 in the real world and in a virtual environment in three degrees of freedom (3DoF) or six degrees of freedom (6DoF). For example, the locators 225 can emit infrared light beams which create light points on real objects around the HMD 200. One or more cameras (not shown) integrated with the HMD 200 can detect the light points. Compute units 230 in the HMD 200 can use the detected light points to extrapolate position and movement of the HMD 200 as well as to identify the shape and position of the real objects surrounding the HMD 200.

The electronic display 245 can be integrated with the front rigid body 205 and can provide image light to a user as dictated by the compute units 230. In various embodiments, the electronic display 245 can be a single electronic display or multiple electronic displays (e.g., a display for each user eye). Examples of the electronic display 245 include: a liquid crystal display (LCD), an organic light-emitting diode (OLED) display, an active-matrix organic light-emitting diode display (AMOLED), a display including one or more quantum dot light-emitting diode (QOLED) sub-pixels, a projector unit (e.g., microLED, LASER, etc.), some other display, or some combination thereof.

In some implementations, the HMD 200 can be coupled to a core processing component such as a personal computer (PC) (not shown) and/or one or more external sensors (not shown). The external sensors can monitor the HMD 200 (e.g., via light emitted from the HMD 200) which the PC can use, in combination with output from the IMU 215 and position sensors 220, to determine the location and movement of the HMD 200.

In some implementations, the HMD 200 can be in communication with one or more other external devices, such as controllers (not shown) which a user can hold in one or both hands. The controllers can have their own IMU units, position sensors, and/or can emit further light points. The HMD 200 or external sensors can track these controller light points. The compute units 230 in the HMD 200 or the core processing component can use this tracking, in combination with IMU and position output, to monitor hand positions and motions of the user. The controllers can also include various buttons a user can actuate to provide input and interact with virtual objects. In various implementations, the HMD 200 can also include additional subsystems, such as an eye tracking unit, an audio system, various network components, etc. In some implementations, instead of or in addition to controllers, one or more cameras included in the HMD 200 or external to it can monitor the positions and poses of the user's hands to determine gestures and other hand and body motions.

Figure 2B:
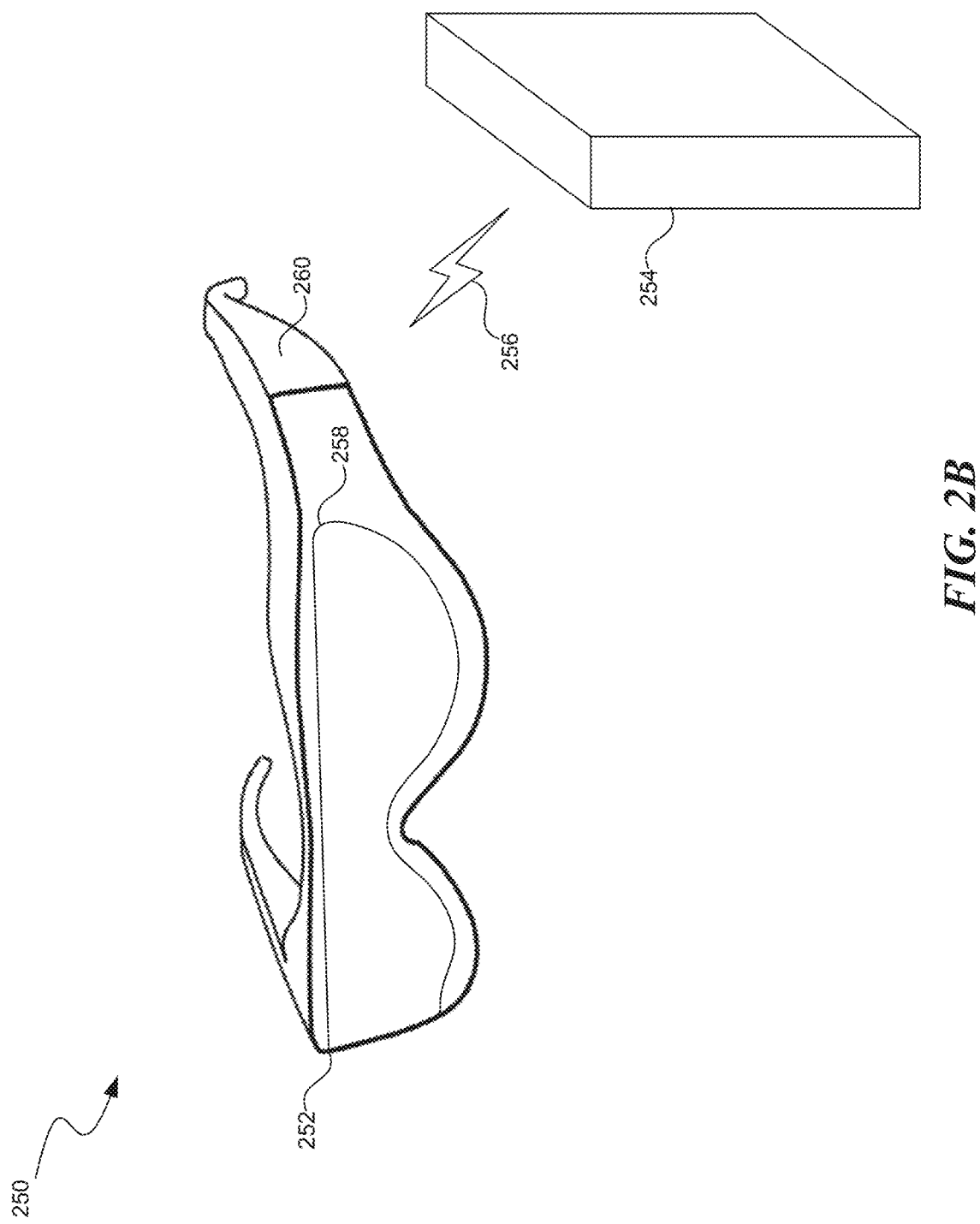
FIG. 2B is a wire diagram illustrating a mixed reality headset which can be used in some implementations of the present technology.

FIG. 2B is a wire diagram of a mixed reality HMD system 250 which includes a mixed reality HMD 252 and a core processing component 254. The mixed reality HMD 252 and the core processing component 254 can communicate via a wireless connection (e.g., a 60 GHz link) as indicated by link 256. In other implementations, the mixed reality system 250 includes a headset only, without an external compute device or includes other wired or wireless connections between the mixed reality HMD 252 and the core processing component 254. The mixed reality HMD 252 includes a pass-through display 258 and a frame 260. The frame 260 can house various electronic components (not shown) such as light projectors (e.g., LASERs, LEDs, etc.), cameras, eye-tracking sensors, MEMS components, networking components, etc.

The projectors can be coupled to the pass-through display 258, e.g., via optical elements, to display media to a user. The optical elements can include one or more waveguide assemblies, reflectors, lenses, mirrors, collimators, gratings, etc., for directing light from the projectors to a user's eye. Image data can be transmitted from the core processing component 254 via link 256 to HMD 252. Controllers in the HMD 252 can convert the image data into light pulses from the projectors, which can be transmitted via the optical elements as output light to the user's eye. The output light can mix with light that passes through the display 258, allowing the output light to present virtual objects that appear as if they exist in the real world.

Similarly to the HMD 200, the HMD system 250 can also include motion and position tracking units, cameras, light sources, etc., which allow the HMD system 250 to, e.g., track itself in 3DoF or 6DoF, track portions of the user (e.g., hands, feet, head, or other body parts), map virtual objects to appear as stationary as the HMD 252 moves, and have virtual objects react to gestures and other real-world objects.

Figure 3:
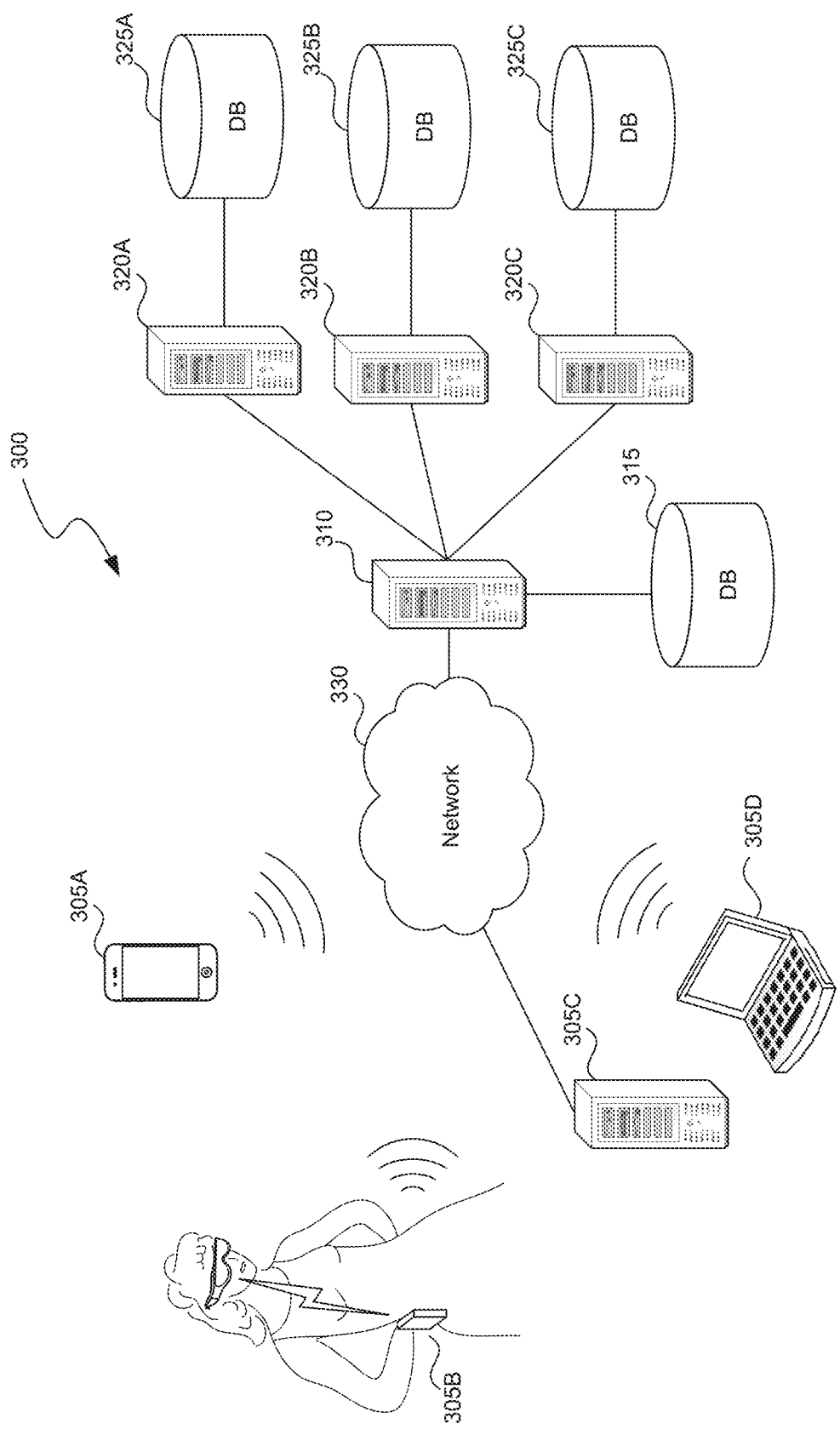
FIG. 3 is a block diagram illustrating an overview of an environment in which some implementations of the present technology can operate.

FIG. 3 is a block diagram illustrating an overview of an environment 300 in which some implementations of the disclosed technology can operate. Environment 300 can include one or more client computing devices 305A-D, examples of which can include computing system 100. In some implementations, some of the client computing devices (e.g., client computing device 305B) can be the HMD 200 or the HMD system 250. Client computing devices 305 can operate in a networked environment using logical connections through network 330 to one or more remote computers, such as a server computing device.

In some implementations, server 310 can be an edge server which receives client requests and coordinates fulfillment of those requests through other servers, such as servers 320A-C. Server computing devices 310 and 320 can comprise computing systems, such as computing system 100. Though each server computing device 310 and 320 is displayed logically as a single server, server computing devices can each be a distributed computing environment encompassing multiple computing devices located at the same or at geographically disparate physical locations.

Client computing devices 305 and server computing devices 310 and 320 can each act as a server or client to other server/client device(s). Server 310 can connect to a database 315. Servers 320A-C can each connect to a corresponding database 325A-C. As discussed above, each server 310 or 320 can correspond to a group of servers, and each of these servers can share a database or can have their own database. Though databases 315 and 325 are displayed logically as single units, databases 315 and 325 can each be a distributed computing environment encompassing multiple computing devices, can be located within their corresponding server, or can be located at the same or at geographically disparate physical locations.

Network 330 can be a local area network (LAN), a wide area network (WAN), a mesh network, a hybrid network, or other wired or wireless networks. Network 330 may be the Internet or some other public or private network. Client computing devices 305 can be connected to network 330 through a network interface, such as by wired or wireless communication. While the connections between server 310 and servers 320 are shown as separate connections, these connections can be any kind of local, wide area, wired, or wireless network, including network 330 or a separate public or private network.

Figure 4:
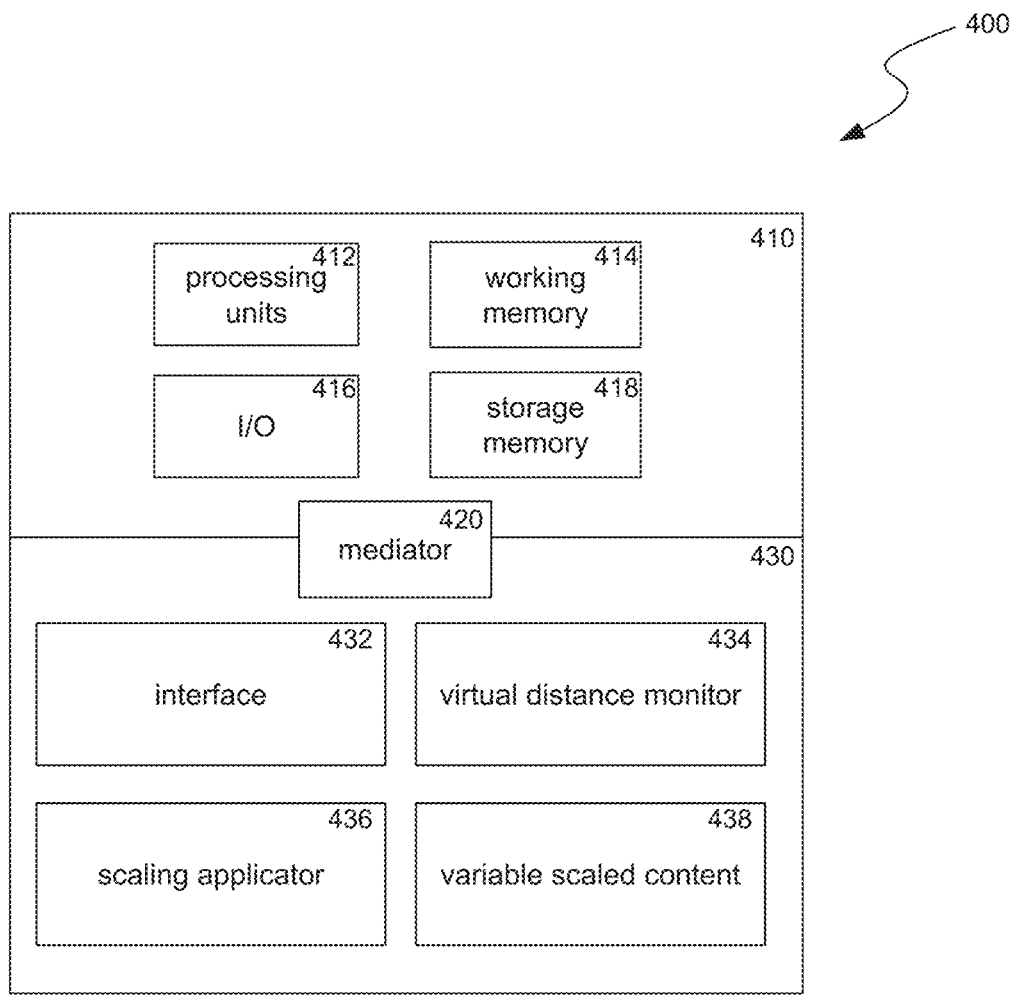
FIG. 4 is a block diagram illustrating components which, in some implementations, can be used in a system employing the disclosed technology.

FIG. 4 is a block diagram illustrating components 400 which, in some implementations, can be used in a system employing the disclosed technology. Components 400 can be included in one device of computing system 100 or can be distributed across multiple of the devices of computing system 100. The components 400 include hardware 410, mediator 420, and specialized components 430. As discussed above, a system implementing the disclosed technology can use various hardware including processing units 412, working memory 414, input and output devices 416 (e.g., cameras, displays, IMU units, network connections, etc.), and storage memory 418. In various implementations, storage memory 418 can be one or more of: local devices, interfaces to remote storage devices, or combinations thereof. For example, storage memory 418 can be one or more hard drives or flash drives accessible through a system bus or can be a cloud storage provider (such as in storage 315 or 325) or other network storage accessible via one or more communications networks. In various implementations, components 400 can be implemented in a client computing device such as client computing devices 305 or on a server computing device, such as server computing device 310 or 320.

Mediator 420 can include components which mediate resources between hardware 410 and specialized components 430. For example, mediator 420 can include an operating system, services, drivers, a basic input output system (BIOS), controller circuits, or other hardware or software systems.

Specialized components 430 can include software or hardware configured to perform operations for selecting content for display at different virtual distances. Specialized components 430 can include virtual distance monitor 434, scaling applicator 436, variable scaled content 438, and components and APIs which can be used for providing user interfaces, transferring data, and controlling the specialized components, such as interface 432. In some implementations, components 400 can be in a computing system that is distributed across multiple computing devices or can be an interface to a server-based application executing one or more of specialized components 430.

In various implementations, a virtual distance can be derived from one or more of a perceived distance between the user and an object, an angle of the object with respect to the user, or an amount of viewable area of the progressive display system's field of view the object covers. Virtual distance monitor 434 can measure whichever of these values the virtual distance incorporates. In some implementations, virtual distance monitor 434 can also normalize these values, apply weights to them, and/or combine them into a single value. Computing virtual distances is discussed in greater detail below in relation to block 502.

Scaling applicator 436 can plot the virtual distance for the target object, from virtual distance monitor 434, in relation to multiple distance ranges to select a current distance range. The distance ranges can correspond to levels of detail and can have bounds set by upper and lower thresholds. In some implementations, the distance ranges can overlap. Scaling applicator 436 can use a mapping of detail levels to content sets, from variable scaled content 438, to select one or more content sets mapped to the distance level corresponding to the current distance range. The selected content set(s) can be displayed in relation to the target object. Identifying scaling changes based on virtual distances and selecting corresponding content to display are discussed in greater detail below in relation to blocks 504-510.

Variable scaled content 438 can be content items associated with objects and organized into sets for display with those objects. Each content set can be mapped to one or more levels of detail, with each level of detail corresponding to one or more distance ranges. The variable scaled content 438 can be selected by scaling applicator 436 based on the virtual distance computed by virtual distance monitor 434.

Those skilled in the art will appreciate that the components illustrated in FIGS. 1-4 described above, and in each of the flow diagrams discussed below, may be altered in a variety of ways. For example, the order of the logic may be rearranged, substeps may be performed in parallel, illustrated logic may be omitted, other logic may be included, etc. In some implementations, one or more of the components described above can execute one or more of the processes described below.

Figure 5:
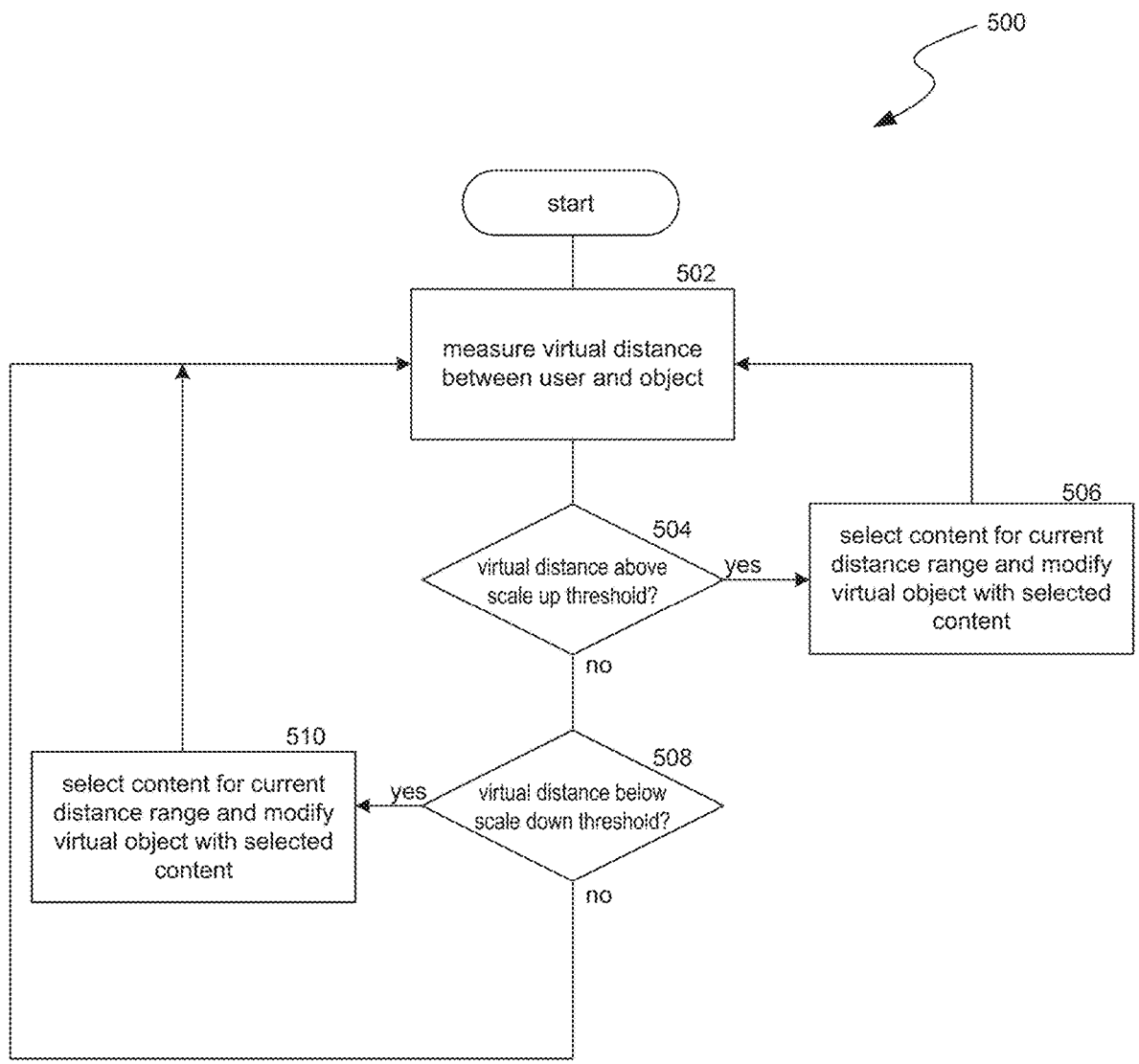
FIG. 5 is a flow diagram illustrating a process used in some implementations of the present technology for progressive display of an object with levels of detail corresponding to virtual distances.

FIG. 5 is a flow diagram illustrating a process 500 used in some implementations of the present technology for progressive display of an object with levels of detail corresponding to virtual distances. A progressive display system can execute process 500 continuously as it updates the display of an object in an augmented reality environment. In various implementations, this can occur, e.g., as the progressive display system generates new display frames and/or in response to a trigger that could indicate a change in virtual distances, such as new position data or when an object changes location, orientation, or size.

At block 502, process 500 can measure a virtual distance. In various implementations, the virtual distance can account for one or more of: a perceived distance between the user and an object, an angle of the object with respect to the user, or an amount of viewable area, of the progressive display system's field of view, the object covers. A "perceived distance" between the user and an object, as used herein, is the distance the object would be from the user if the artificial reality environment were real, i.e. the distance at which the progressive display system is attempting to show the object. An angle of the object with respect to the user can be an angle of the object to a device worn by the user (e.g., a head mounted display) or to a body part of the user, e.g., a head or torso of the user. In some implementations, the angle of an object to the user can be the angle between the object and a line representing a tracked gaze of the user. In some implementations, the angle of the object with respect to the user can be for a particular part of an object such as a face for displaying controls or readable content. Process 500 can also determine an amount of viewable area or "footprint" that the object covers in the field of view. For example, process 500 can determine a percentage of a total viewable area that an object takes up. An object's footprint can signify how prominent an object is for a user and thus how much content the user can comprehend in relation to the object.

In some implementations, process 500 can be performed with respect to an object that make up parts of other objects. For example, the process 500 can select a content set for display on a clock face (e.g., based on the angle of the clock to the user) and content for a menu on the side of the clock, e.g., based on the footprint of the clock. In some implementations where more than one value is used to determine the virtual distance, a function can convert the values into a common domain and/or apply scaling or weighting to the various values. In other implementations where more than one value is used to determine the virtual distance, the values can be stored separately in a data structure (e.g., a vector) and these values can be mapped to content sets of different types. For example, a menu displayed next to a virtual tablet can have content that changes based on a perceived distance, as this is the main factor for whether the user will be able to accurately use the controls, while text for display on a face of the tablet can change based on the tablet's angle to the user, as this is the main factor for whether the user will be able to read the text.

At block 504, process 500 can determine whether the virtual distance determined at block 502 is above a scale-up threshold. In some implementations, this can include comparing the virtual distance to a defined scaling threshold. In other implementations, this can include comparing the virtual distance to a set of distance ranges, with bounds defined by scale-up and scale-down thresholds, and determining whether the current virtual distance corresponds to a new distance range (i.e. a distance range other than the distance range corresponding to the display level for the currently displayed content). If process 500 determines that the virtual distance is above the scale-up threshold or that the new distance range is above the previous distance range, process 500 can continue to block 506. Otherwise process 500 can continue to block 508.

At block 508, process 500 can determine whether the virtual distance determined at block 502 is below a scale-down threshold. Similarly to block 504, this can include A) comparing the virtual distance to a defined scale threshold or B) comparing the virtual distance to a set of distance ranges, with bounds defined by the scale-up and scale-down thresholds, and determining whether the current virtual distance corresponds to a new distance range. In some implementations, a lowest distance range can have no lower bound or a highest distance range can have no upper bound.

In some implementations, the scale-up threshold, from block 504, between two distance ranges can be different from the scale-down threshold, from block 508, between the same two distance ranges. For example, the scale-up threshold can be larger than the scale-down threshold, resulting in the distance ranges overlapping. By having different scale-up and scale-down thresholds between each consecutive distance range, process 500 applies hysteresis. When hysteresis is applied, once the virtual distance has increased enough to cross the scale-up threshold and into the next higher distance range, the virtual distance must decrease the amount between the scale-up and scale-down thresholds between those two distance ranges before crossing back into the lower distance range. This prevents jitter that would occur between content sets corresponding to distance ranges if there were only a single boundary between distance ranges and a virtual distance was hovering right at that boundary.

If process 500 determines that the virtual distance is below the scale-down threshold or that the new distance range is below the previous distance range, process 500 can continue to block 510. Otherwise process 500 can return to block 502 immediately, or upon a next trigger for process 500, update the virtual distance.

At block 506, having found the virtual distance above the scale-up threshold at block 502, process 500 can select the one or more sets of content mapped to the one or more levels of detail that correspond to the current (higher) distance range. Process 500 can then modify display of the virtual object to show the selected one or more sets of content. Similarly, at block 510, having found the virtual distance below the scale-down threshold at block 508, process 500 can select the one or more sets of content mapped to the one or more levels of detail that correspond to the current (lower) distance range. Process 500 can then modify display of the virtual object to show the selected one or more sets of content.

In some implementations, objects can have multiple content items associated with them. Content items can be other objects (e.g., 2D or 3D objects, controls, menu items, interfaces, text, etc.), surface designs, images, or other ornamentation, style modifiers, etc. The content items associated with some objects can be combined into sets, and each content set can be mapped to one or more levels of detail. In some implementations, the content sets can overlap, e.g., a content item can be included in more than one set. Each distance level can correspond to one or more distance ranges. Thus, when a current distance range is identified (e.g., at block 504 or 508), process 500 can, at block 506 or 510, identify for a given object the level(s) of detail mapped to the current distance range, select the content set(s) corresponding to the identified level(s) of detail, and modify display of the given object to include the selected content sets.

In some implementations, in addition to selecting one or more content set(s) to display, the content set(s) can include style parameters defining how they are displayed (e.g., coloring, outlines, shapes, fonts, etc.) or how they act or interact in the artificial reality environment (e.g., spacing, overlapping, applied gravity or other virtual forces, paths or other movement parameters, etc.) For example, an object can appear stationary when the virtual distance is in a first distance range but then have a movement path applied when the virtual distance is in a second, lower distance range. As another example, two objects may not interact when the virtual distance is in a first distance range but then have one or more virtual forces applied when the virtual distance is in a second distance range.

In some implementations, when sets of content are selected for display, this can also include causing other content not in the selected content set(s) to not be displayed. In some implementations, an object can also be associated with a core set of content items separate from the levels of detail which are always displayed with the object, regardless of the current distance range, or that are mapped to all the detail levels. For example, the general shape of a content item can be defined by a core set of 3D objects, while the content items that are displayed on the various surfaces of the 3D objects, and how those content items are arranged, can depend on the current level(s) of detail.

FIGS. 6A-6E are conceptual diagrams illustrating an example of a progressive display of a virtual clock 600. Virtual clock 600 is associated with content items including a circular face 602, an hour hand 604, a minute hand 606, a second hand 608, a date indicator 610, hour markers such as hour marker 612, hour numbers such as hour number 614, minute markers such as minute marker 616, and a digital time indicator 618. The content items associated with virtual clock 600 are grouped into five content sets, with each content set mapped to one of five levels of detail corresponding to a virtual distance range.

Figure 6A:
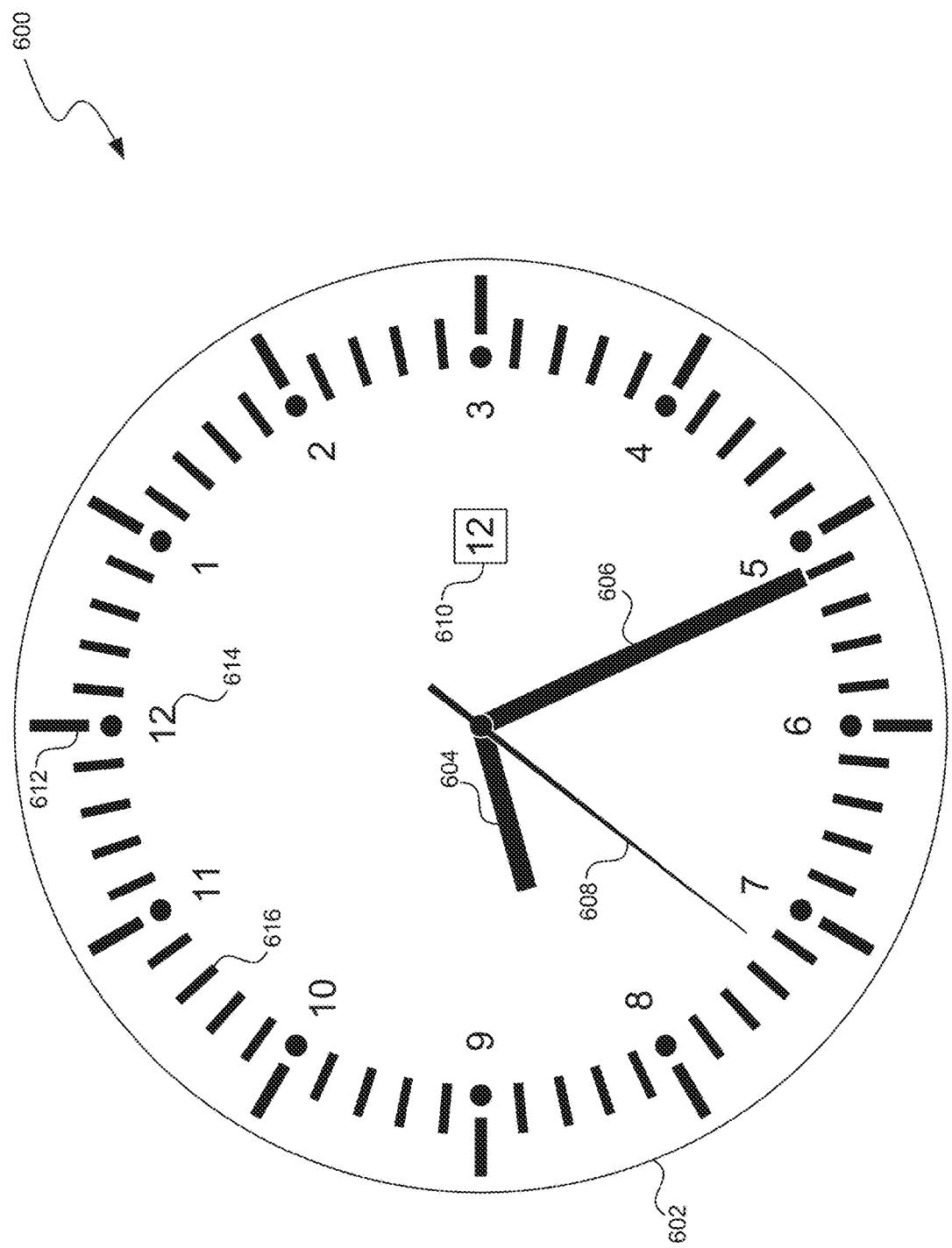
FIGS. 6A-6E are conceptual diagrams illustrating a first example progressive display of a virtual object.

A first content set for virtual clock 600 is mapped to a closest distance level where the virtual distance is in a lowest distance range. As shown in FIG. 6A, the first content set includes the circular face 602, the hour hand 604, the minute hand 606, the second hand 608, the date indicator 610, the hour markers such as hour marker 612, the hour numbers such as hour number 614, and the minute markers such as minute marker 616. The digital time indicator 618 is not included in the first content set and thus is not shown in FIG. 6A.

Figure 6B:
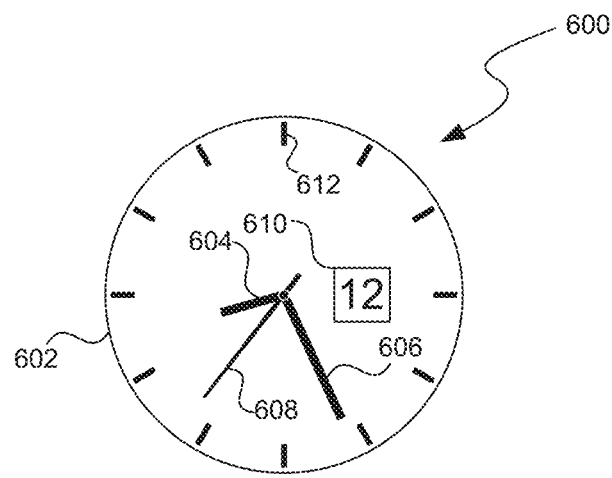

A second content set for virtual clock 600 is mapped to a second distance level where the virtual distance is in a next further distance range. As shown in FIG. 6B, the second content set includes the circular face 602, the hour hand 604, the minute hand 606, the second hand 608, the date indicator 610, and the hour markers such as hour marker 612. The hour numbers such as hour number 614, the minute markers such as minute marker 616, and the digital time indicator 618 are not included in the second content set and thus are not shown in FIG. 6B.

Figure 6C:
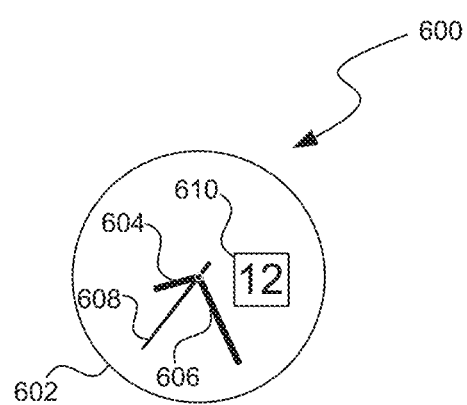

A third content set for virtual clock 600 is mapped to a third distance level where the virtual distance is in a next further distance range. As shown in FIG. 6C, the third content set includes the circular face 602, the hour hand 604, the minute hand 606, the second hand 608, and the date indicator 610. The hour markers such as hour marker 612, the hour numbers such as hour number 614, the minute markers such as minute marker 616, and the digital time indicator 618 are not included in the third content set and thus are not shown in FIG. 6C.

Figure 6D:
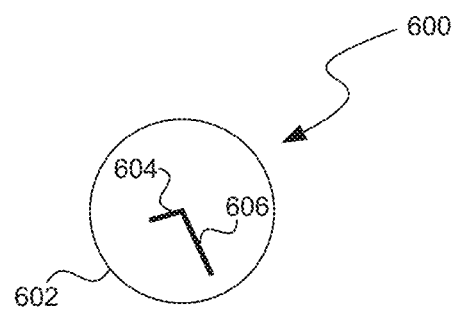

A fourth content set for virtual clock 600 is mapped to a fourth distance level where the virtual distance is in a next further distance range. As shown in FIG. 6D, the fourth content set includes the circular face 602, the hour hand 604, and the minute hand 606. The second hand 608, the date indicator 610, the hour markers such as hour marker 612, the hour numbers such as hour number 614, the minute markers such as minute marker 616, and the digital time indicator 618 are not included in the fourth content set and thus are not shown in FIG. 6D.

Figure 6E:
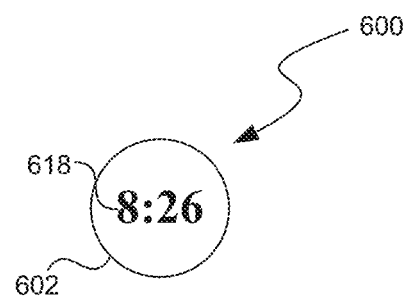

A fifth content set for virtual clock 600 is mapped to a fifth distance level where the virtual distance is in the furthest distance range. As shown in FIG. 6E, the fifth content set includes the circular face 602 and the digital time indicator

618. The hour hand 604, the minute hand 606, the second hand 608, the date indicator 610, the hour markers such as hour marker 612, the hour numbers such as hour number 614, and the minute markers such as minute marker 616 are not included in the fifth content set and thus are not shown in FIG. 6E.

Figure 7A:
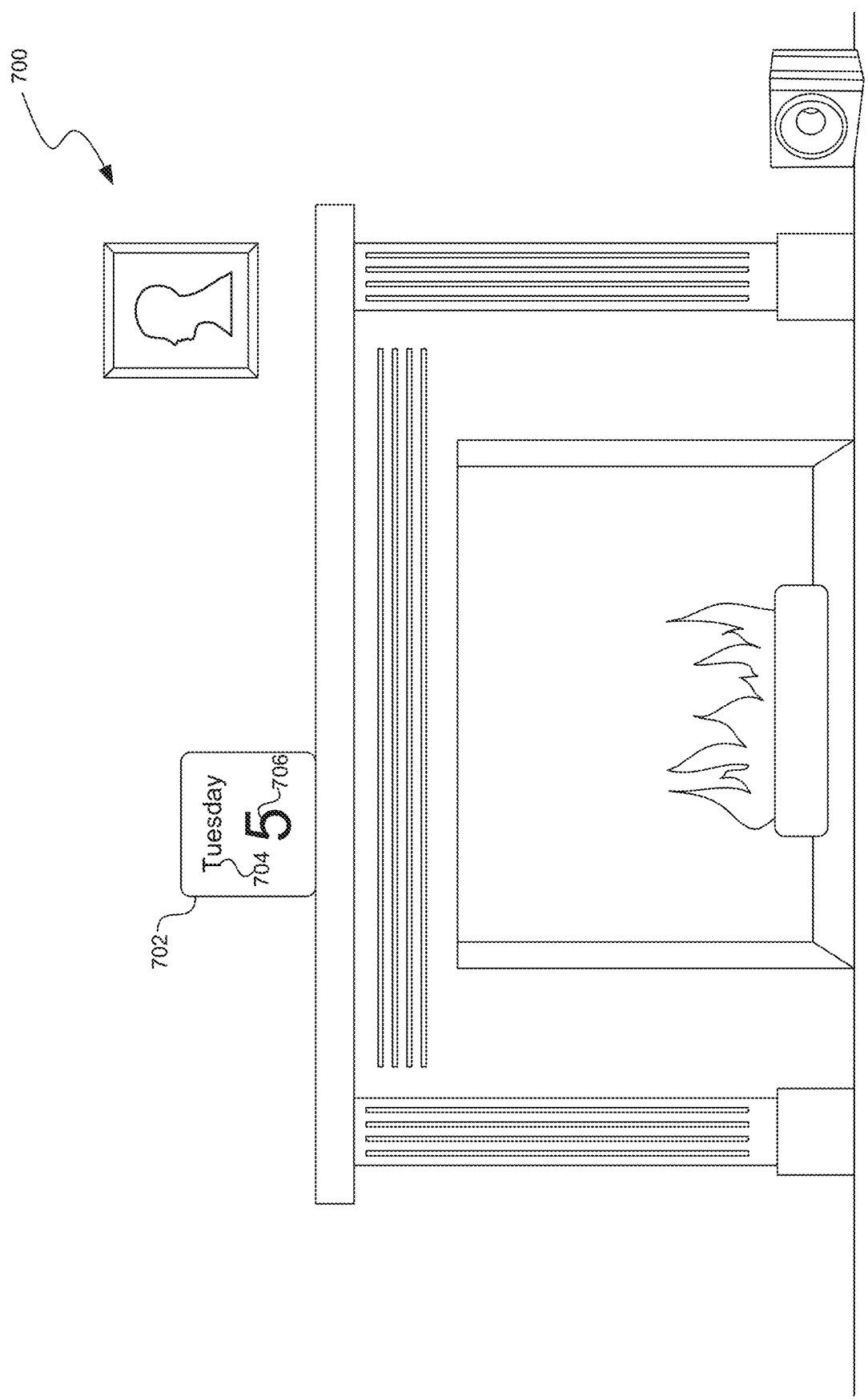
FIGS. 7A-7C are conceptual diagrams illustrating a second example progressive display of a virtual object.
Figure 7B:
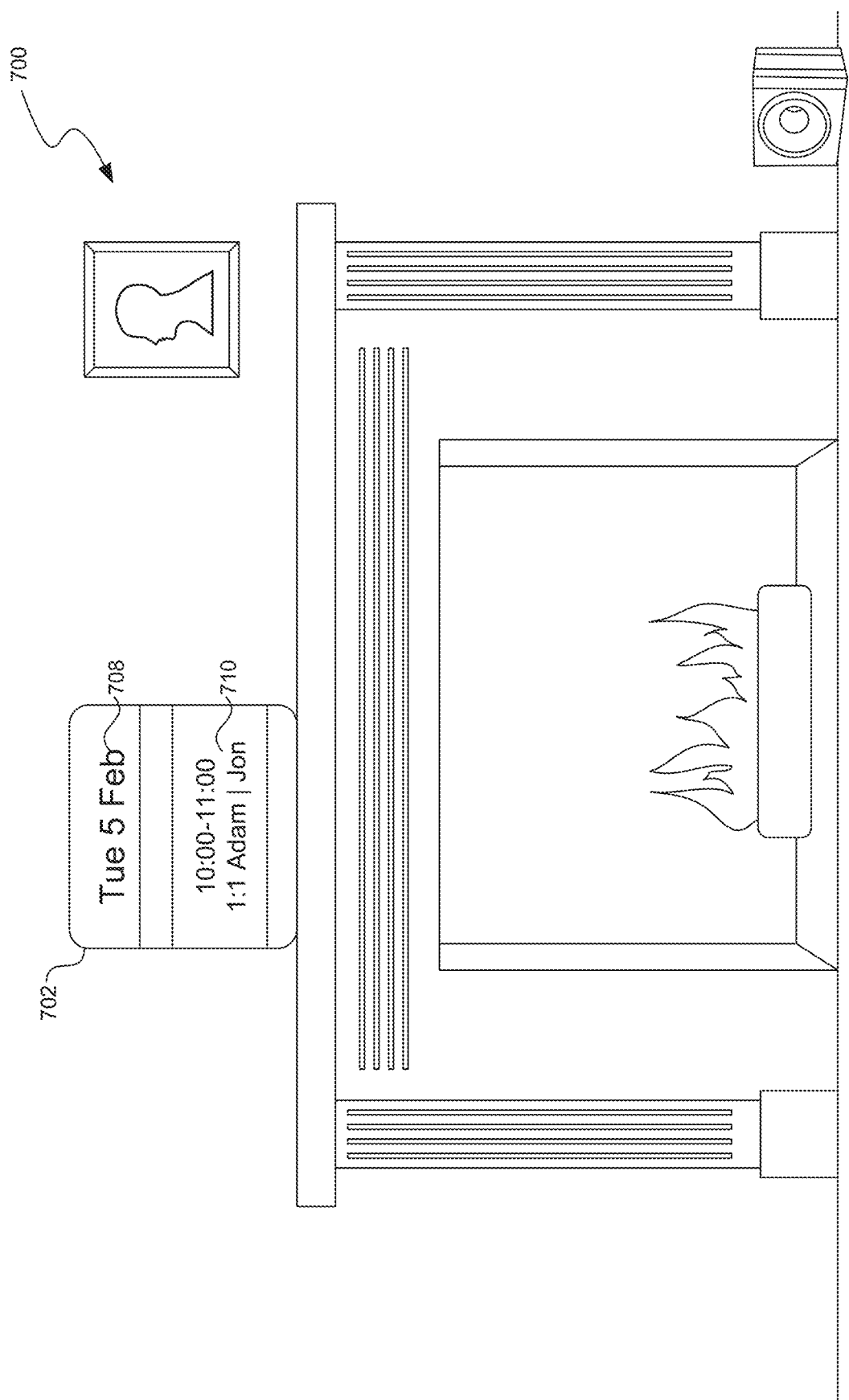
Figure 7C:
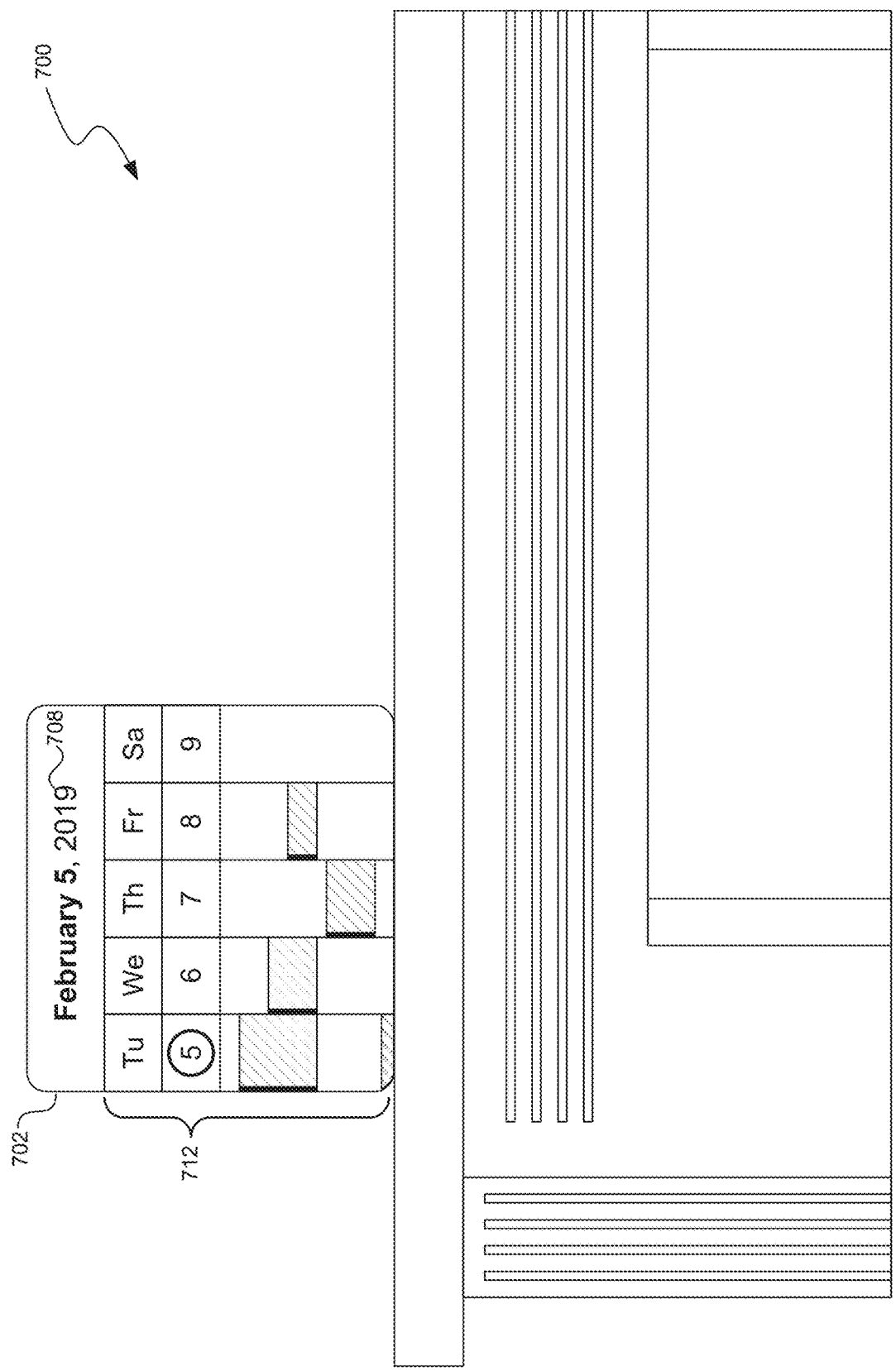

FIGS. 7A-7C are conceptual diagrams illustrating an example of a progressive display of a virtual calendar 702 in a virtual environment 700. Virtual calendar 702 is associated with content items including a weekday indicator 704, a day indicator 706, a date indicator 708, a calendar entry 710, and a calendar schedule 712. The content items associated with virtual calendar 702 are grouped into three content sets, with each content set mapped to one of three levels of detail corresponding to a virtual distance range. Virtual calendar 702 also has a core calendar face content item, which is shown regardless of the virtual distance.

A first content set for virtual calendar 702 is mapped to a furthest distance level where the virtual distance is in a highest distance range. As shown in FIG. 7A, the first content set includes the weekday indicator 704 and the day indicator 706. The date indicator 708, the calendar entry 710, and the calendar schedule 712 are not included in the first content set and thus are not shown in FIG. 7A.

A second content set for virtual calendar 702 is mapped to a second distance level where the virtual distance is in a next closer distance range. As shown in FIG. 7B, the second content set includes the date indicator 708 and the calendar entry 710 with details of the next upcoming item on the user's calendar. The weekday indicator 704, the day indicator 706, and the calendar schedule 712 are not included in the first content set and thus are not shown in FIG. 7B.

A third content set for virtual calendar 702 is mapped to a third distance level where the virtual distance is in a closest distance range. As shown in FIG. 7C, the third content set includes the date indicator 708 and the calendar schedule 712 showing the user's calendar appointments for the next five days. The date indicator 708 is linked to a style setting that changes depending on the current level of detail, and thus is displayed differently between FIGS. 7B and 7C. The weekday indicator 704, the day indicator 706, and the calendar entry 710 are not included in the first content set and thus are not shown in FIG. 7C.

Figure 8:
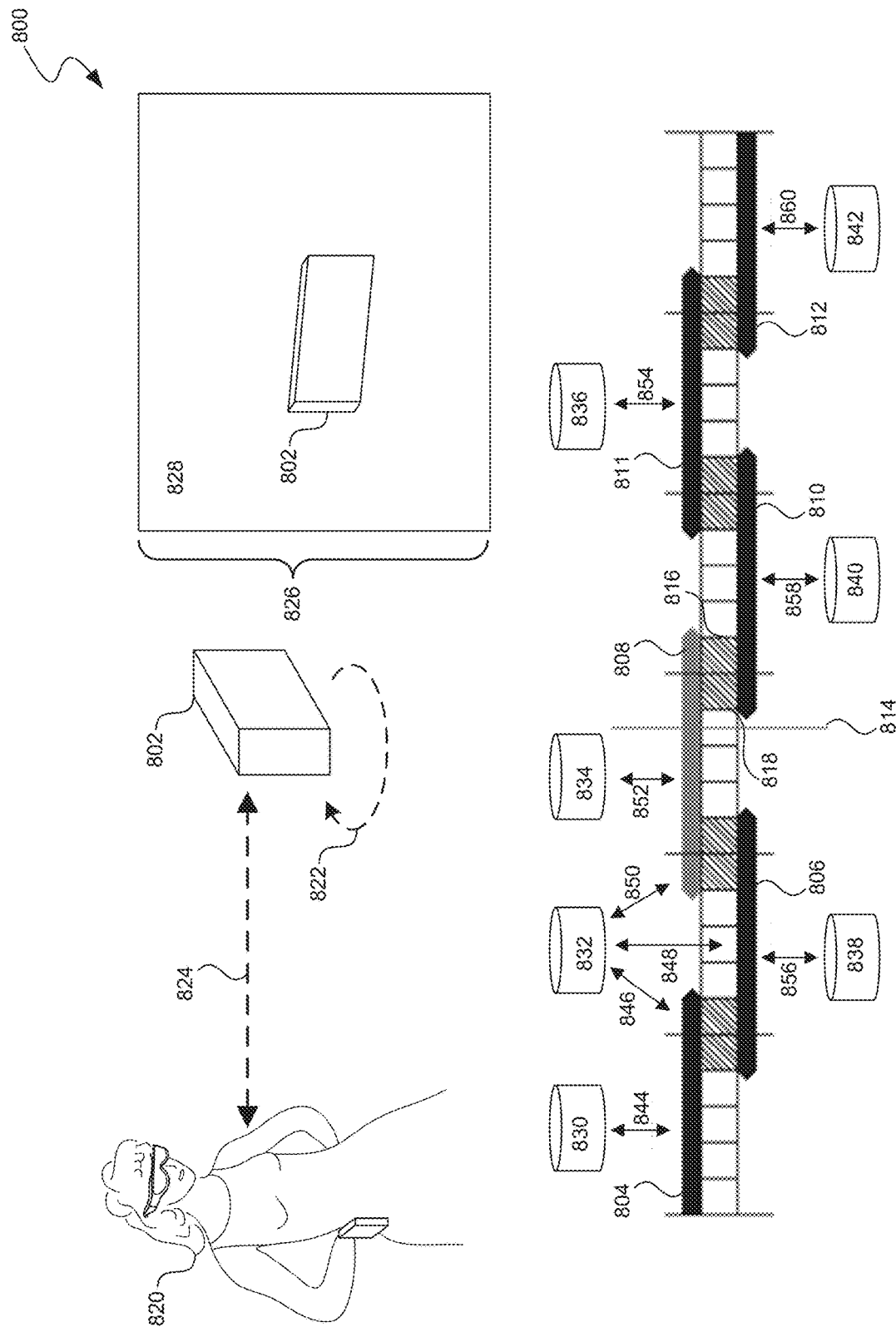
FIG. 8 is a conceptual diagram illustrating computing a virtual distance and selecting content for an object based on content mapped to a distance range in which the virtual distance falls.

FIG. 8 is a conceptual diagram 800 illustrating an example of computing a virtual distance 814 between a virtual object 802 and a user 820 and using this virtual distance to select content to display. The virtual object 802 is associated with content items which are grouped into content sets 830, 832, 834, 836, 838, 840, and 842. Some content items can be in multiple content sets.

The progressive display system determines the virtual distance 814, in this example, by combining three values: a perceived distance 824 between the virtual object 802 and the user 820, an angle 822 of the virtual object 802 with respect to the user 820, and a footprint 826 that the virtual object 802 takes up in field of view 828. The perceived distance 824 between the virtual object 802 and the user 820 can be a distance that the virtual object 802 would be from the user if the virtual object 802 were a real object. The angle 822 of the virtual object 802 with respect to the user 820 is how far a plane along a specified surface of the virtual object 802 (in this case the long face closest to the user) is rotated as compared to the coronal plane of the user. The footprint 826 is the percentage of the field of view 828 that the virtual object 802 takes up when drawn by the progressive display system. These three values are normalized, weighted, and combined into a single virtual distance value, represented by virtual distance line 814.

The virtual distance 814 is plotted against distance ranges 804, 806, 808, 810, 811, and 812. Each of the distance ranges 804, 806, 808, 810, 811, and 812 corresponds to a level of detail and the distance ranges 804, 806, 808, 810, 811, and 812 have overlapping high and low sections to apply hysteresis between scale-up thresholds (e.g., scale-up threshold 816) and scale-down thresholds (e.g., scale-down threshold 818). In diagram 800, each distance range is also a corresponding detail level.

The distance ranges 804, 806, 808, 810, 811, and 812 (which in this case are also the detail levels) are mapped to one or more content sets. In this example, distance range 804 is mapped to content sets 830 and 832, as shown by arrows 844 and 846; distance range 806 is mapped to content sets 832 and 838, as shown by arrows 848 and 856; distance range 808 is mapped to content sets 832 and 834, as shown by arrows 850 and 852; distance range 810 is mapped to content set 840, as shown by arrow 858; distance range 811 is mapped to content set 836, as shown by arrow 854; and distance range 812 is mapped to content set 842, as shown by arrow 860.

In this example, based on the virtual distance 814 being in distance range 808, and distance range 808 being mapped to content sets 832 and 834, content sets 832 and 834 are selected for display with virtual object 802.

Reference in this specification to "implementations" (e.g., "some implementations," "various implementations," "one implementation," "an implementation," etc.) means that a particular feature, structure, or characteristic described in connection with the implementation is included in at least one implementation of the disclosure. The appearances of these phrases in various places in the specification are not necessarily all referring to the same implementation, nor are separate or alternative implementations mutually exclusive of other implementations. Moreover, various features are described which may be exhibited by some implementations and not by others. Similarly, various requirements are described which may be requirements for some implementations but not for other implementations.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle-specified number of items, or that an item under comparison has a value within a middle-specified percentage range. Relative terms, such as high or unimportant, when not otherwise defined, can be understood as assigning a value and determining how that value compares to an established threshold. For example, the phrase "selecting a fast connection" can be understood to mean selecting a connection that has a value assigned corresponding to its connection speed that is above a threshold.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

Although the subject matter has been described in language specific to structural features and/or methodological acts, it is to be understood that the subject matter defined in the appended claims is not necessarily limited to the specific features or acts described above. Specific embodiments and implementations have been described herein for purposes of illustration, but various modifications can be made without deviating from the scope of the embodiments and implementations. The specific features and acts described above are disclosed as example forms of implementing the claims that follow. Accordingly, the embodiments and implementations are not limited except as by the appended claims.

Any patents, patent applications, and other references noted above are incorporated herein by reference. Aspects can be modified, if necessary, to employ the systems, functions, and concepts of the various references described above to provide yet further implementations. If statements or subject matter in a document incorporated by reference conflicts with statements or subject matter of this application, then this application shall control.

We claim:

1. A method for displaying objects in an augmented reality environment, the method comprising:
computing an amount of a viewable area, of a 3D augmented reality display system's field of view, that a depiction of a 3D virtual object occupies on the 3D augmented reality display system's field of view, wherein the 3D augmented reality display system's field of view is a viewable area to which the 3D augmented reality display system can provide visual output, wherein the 3D virtual object is associated with multiple sets of content, and wherein each set of content is mapped to one or more of multiple levels of detail with each level of detail corresponding to one or more ranges;
determining that the amount of the viewable area that the depiction of the 3D virtual object occupies is above a scale-up threshold; and
in response to determining that the amount of the viewable area that the depiction of the 3D virtual object occupies is above the scale-up threshold:
selecting the one or more sets of content mapped to the one or more levels of detail that correspond a range above the scale-up threshold; and
modifying display of the 3D virtual object to show the selected one or more sets of content.

2. The method of claim 1, wherein computing the amount of the viewable area that the depiction of the 3D virtual object occupies is based, at least in part, on an angle of the 3D virtual object with respect to a user.

3. The method of claim 1, wherein at least one of the multiple sets of content includes a content item that is in at least one other of the multiple sets of content.

4. The method of claim 1, wherein:
at least a first set of content, of the multiple sets of content, includes a content item that is in at least a second set of content, of the multiple sets of content;
a first level of detail, that the first set of content is mapped to, is mapped to a first style for the content item, and a second level of detail, that the second set of content is mapped to, is mapped to a second style for the content item; and
when the first level of detail corresponds to the range, the first style is applied to the content item and when the second level of detail corresponds to the range, the second style is applied to the content item.

5. The method of claim 1, wherein:
at least a first content set, of the one or more sets of content, includes a menu item associated with the 3D virtual object and at least a second content set, of the multiple sets of content, does not include the menu item;
when the amount of the viewable area that the depiction of the 3D virtual object occupies is in a first range mapped to the first content set, the menu item is displayed, enabling functionality; and
when the amount of the viewable area that the depiction of the 3D virtual object occupies is in a second range mapped to the second content set but not the first content set, the functionality is disabled due to the menu item not being displayed.

6. The method of claim 1, wherein:
the range is a second range that falls in a sequence of partially overlapping ranges including a first range with which the second range partially overlaps;
the scale-up threshold corresponds to the lower bound of the second range when the amount of the viewable area that the depiction of the 3D virtual object occupies enters the second range from the first range; and
a scale-down threshold, which is lower than the scale-up threshold, corresponds to the lower bound of the second range when the amount of the viewable area that the depiction of the 3D virtual object occupies leaves the second range and enters the first range.

7. A computer-readable storage medium storing instructions that, when executed by a computing system, cause the computing system to perform operations for displaying objects in an augmented reality environment, the operations comprising:
measuring an amount of a viewable area, of a 3D augmented reality display system's field of view, that a depiction of a 3D virtual object occupies on the 3D augmented reality display system's field of view, wherein the 3D augmented reality display system's field of view is a viewable area to which the 3D augmented reality display system can provide visual output, wherein the 3D virtual object is associated with multiple sets of content, and wherein each set of content is mapped to one or more of multiple levels of detail with each level of detail corresponding to one or more ranges;
identifying a range, of the one or more ranges, in which the amount of the viewable area that the depiction of the 3D virtual object occupies falls; and
in response to identifying the range
selecting the one or more sets of content mapped to the one or more levels of detail that correspond to the range; and
displaying, in relation to the 3D virtual object, the selected one or more sets of content.

8. The computer-readable storage medium of claim 7, wherein measuring the amount of the viewable area that the depiction of the 3D virtual object occupies is based on a value representing an angle of the 3D virtual object with respect to a user.

9. The computer-readable storage medium of claim 7, wherein at least one of the multiple sets of content includes a content item that is in at least one other of the multiple sets of content.

10. The computer-readable storage medium of claim 7, wherein:
at least a first set of content, of the multiple sets of content, includes a content item that is in at least a second set of content, of the multiple sets of content;
a first level of detail, that the first set of content is mapped to, is mapped to a first style for the content item, and a second level of detail, that the second set of content is mapped to, is mapped to a second style for the content item; and
when the first level of detail corresponds to the range, the first style is applied to the content item and when the second level of detail corresponds to the range, the second style is applied to the content item.

11. The computer-readable storage medium of claim 7, wherein:
at least a first content set, of the one or more sets of content, includes a menu item associated with the 3D virtual object and at least a second content set, of the multiple sets of content, does not include the menu item;
when the amount of the viewable area that the depiction of the 3D virtual object occupies is in a first range mapped to the first content set, the menu item is displayed, enabling functionality; and
when the amount of the viewable area that the depiction of the 3D virtual object occupies is in a second range mapped to the second content set but not the first content set, the functionality is disabled.

12. The computer-readable storage medium of claim 7, wherein:
the amount of the viewable area that the depiction of the 3D virtual object occupies is a first amount;
the range is a second range that falls in a sequence of partially overlapping ranges including a first range with which the second range partially overlaps;
identifying the second range comprises, in response to determining that a previous virtual distance fell in the first range, determining that the first amount falls in the second range due to the first amount falling in a portion of the second range that is above the overlap with the first range; and
the operations further comprise:
measuring a second virtual distance between a user and the 3D virtual object; and
in response to determining that the first amount was in the second range, identifying that the second virtual distance falls in the first range due to the second virtual distance falling in a portion of the first range that is below the overlap with the first range.

13. A computing system for displaying objects in an augmented reality environment, the computing system comprising:
one or more processors; and
a memory storing instructions that, when executed by the computing system, cause the one or more processors to perform operations comprising
measuring an amount of a viewable area, of a 3D augmented reality display system's field of view, that an 3D object occupies in the 3D augmented reality display system's field of view, wherein the 3D augmented reality display system's field of view is a viewable area to which the 3D augmented reality display system can provide visual output, wherein the 3D object is associated with multiple sets of content, and wherein each set of content is mapped to one or more ranges;
identifying a range based on the amount of the viewable area that the depiction of the 3D object occupies; and
in response to identifying the range
selecting the one or more sets of content mapped to the range; and
displaying, in relation to the 3D object, the selected one or more sets of content.

14. The computing system of claim 13, wherein measuring the amount of the viewable area that the 3D object occupies is based on a value representing an angle of the 3D object with respect to a user.

15. The computing system of claim 13, wherein:
at least a first set of content, of the multiple sets of content, includes a content item that is in at least a second set of content, of the multiple sets of content;
a first range, that the first set of content is mapped to, is mapped to a first style for the content item, and a second range, that the second set of content is mapped to, is mapped to a second style for the content item; and
when the amount of the viewable area that the 3D object occupies falls in the first range, the first style is applied to the content item and when the amount of the viewable area that the 3D object occupies falls in the second range, the second style is applied to the content item.

16. The computing system of claim 13, wherein:
the amount of the viewable area that the 3D object occupies is a first amount;
the range is a second range that falls in a sequence of partially overlapping ranges including a first range with which the second range partially overlaps;
identifying the second range comprises, in response to determining that a previous amount of the viewable area that the 3D object occupies fell in the first range, determining that the first amount falls in the second range due to the amount of the viewable area that the 3D object occupies falling in a portion of the second range that is above the overlap with the first range; and
the operations further comprise
measuring a second amount of the viewable area that the 3D object occupies; and
in response to determining that the first amount was in the second range, identifying that the second amount of the viewable area that the 3D object occupies falls in the first range due to the second amount of the viewable area that the 3D object occupies falling in a portion of the first range that is below the overlap with the first range.

17. The computing system of claim 13, wherein identifying the range is further based on which application is in control of the 3D object, wherein different applications of the computing system have different mappings for sets of content to the amount of the viewable area that the depiction of the 3D object occupies.

18. The computing system of claim 13, wherein selecting the one or more sets of content comprises selecting one or more controls, buttons, or menu options that can be activated by a user, and wherein one or more other controls, buttons, or menu options that can be activated by the user are mapped to another range, different from the range.

19. The computing system of claim 13, wherein the 3D object is a real-world object.

20. The computing system of claim 13, wherein the one or more sets of content, mapped to the range, are mapped in a mapping defined by an entity that created the 3D object.

* * * * *